April 7, 1931. C. F. ORTMAN 1,800,098
FOUR-HORSE HITCH FOR PLOWS
Filed June 25, 1929 3 Sheets-Sheet 1
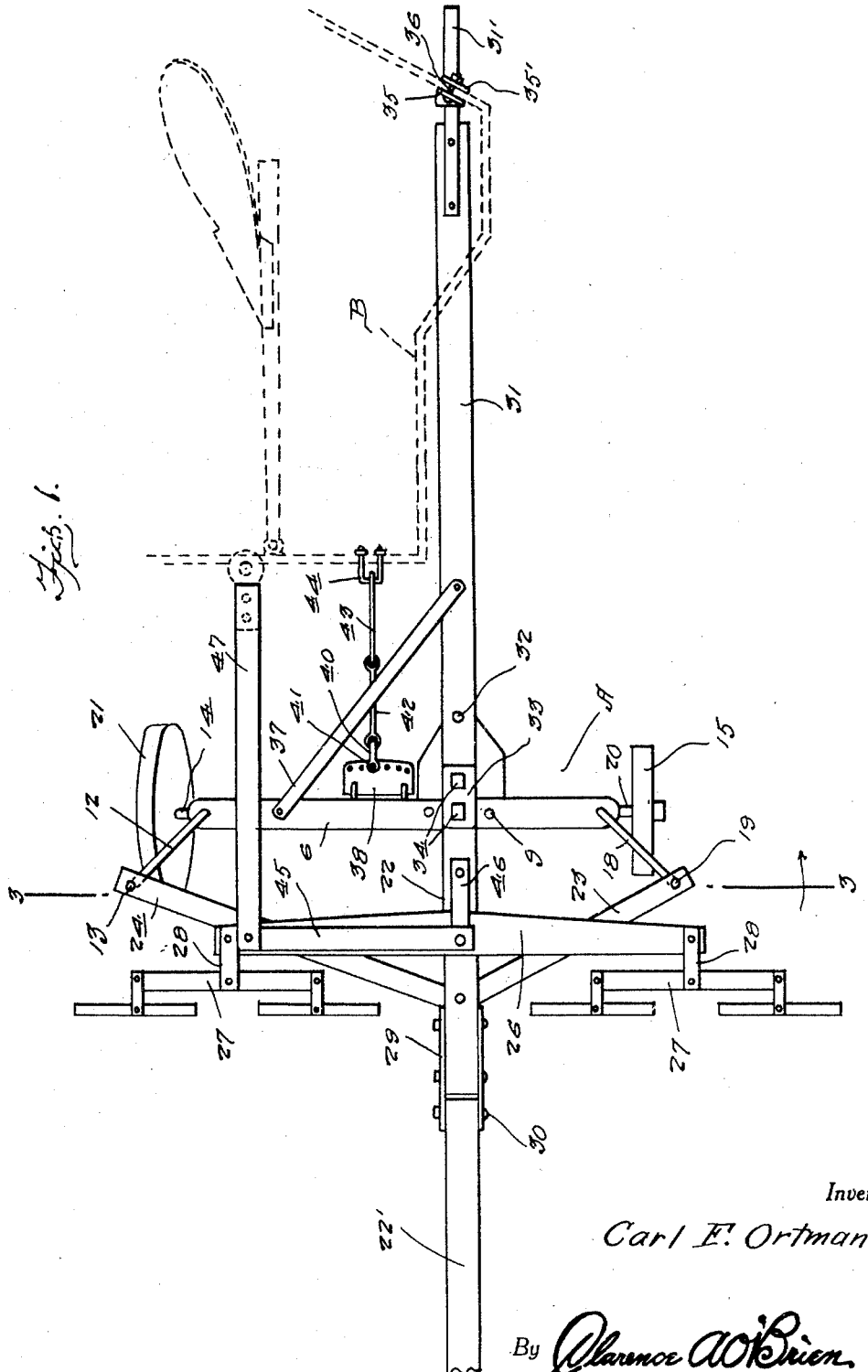
Inventor
Carl F. Ortman
By Clarence A O'Brien
Attorney

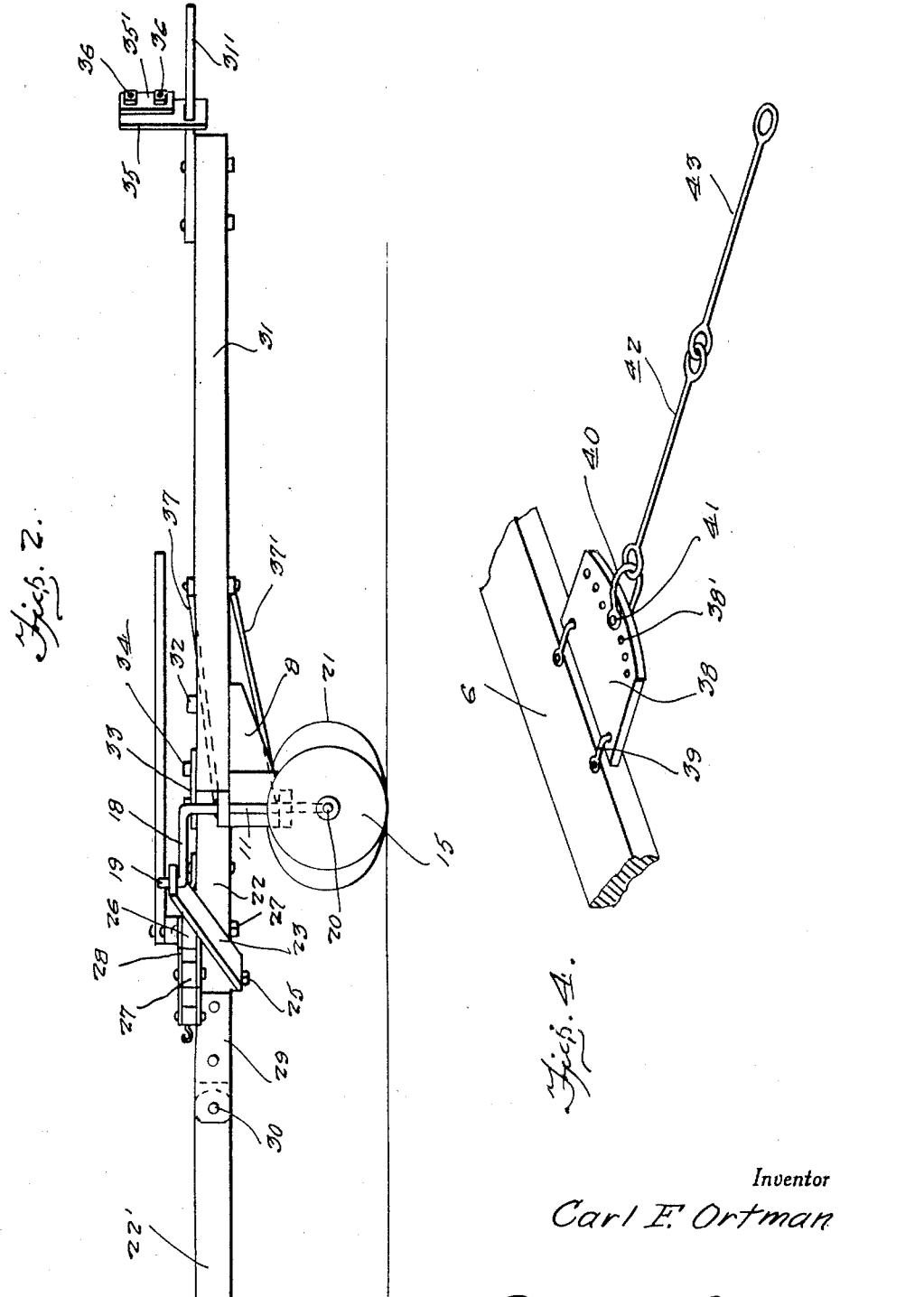

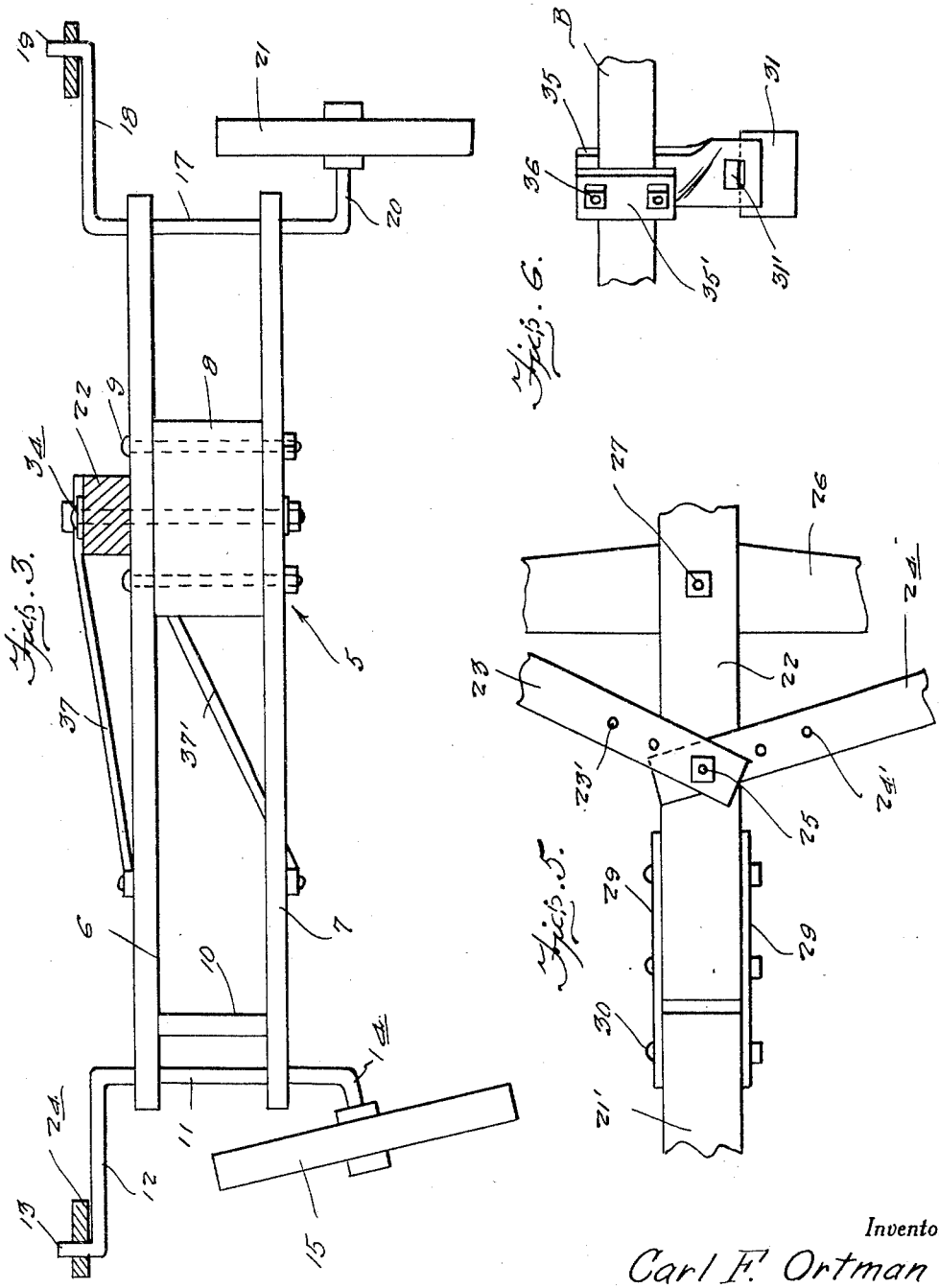

Patented Apr. 7, 1931

1,800,098

UNITED STATES PATENT OFFICE

CARL F. ORTMAN, OF MARTINTON, ILLINOIS

FOUR-HORSE HITCH FOR PLOWS

Application filed June 25, 1929. Serial No. 373,539.

This invention relates to new and useful improvements in hitch devices and has more particular reference to an improved hitch device whereby four animals may be hitched to a sulky plow, and in such a manner that the weight may be equally distributed among the four animals.

Another very important object of this invention is to provide a hitch of the class above mentioned, which may be readily and easily attached to a sulky plow, without in any way materially altering the construction of the plow, and the general object of the invention may be said to be the provision of means whereby four horses may be hitched to a certain make of plow, whereas heretofore it has been possible to hitch but three horses.

Another very important object of this invention is to provide an improved hitch device of this type, which is simple in construction, strong, durable, practical, positive in operation, thoroughly reliable and efficient and otherwise well adapted for the purpose designed.

Other objects and advantages of the invention will become more apparent during a study of the following description, taken in connection with the accompanying drawings, wherein:

Figure 1 is a top plan view of my improved hitch device and showing the manner of application of the same to a sulky car.

Figure 2 is a side elevation of the hitch.

Figure 3 is a view partly in section and partly in elevation, of the front of my improved hitch, taken substantially on the line 3—3 of Figure 1.

Figure 4 is a detail perspective view of the connecting device, whereby the hitch may be connected to the plow.

Figure 5 is a bottom plan view of the hitch tongue constructed in accordance with this invention.

Figure 6 is a fragmentary detail view of a clamp for securing the frame of the plow to the tail bar of my improved hitch.

With reference more in detail to the drawings, it will be seen that my improved tractor hitch is designated generally by the reference character A and as illustrated in Figure 3, comprises a bolster, designated generally by the reference character 5 and thus the said bolster comprises a pair of superposed spaced parallel horizontally disposed upper and lower members 6 and 7 respectively. These members 6 and 7 are in the nature of elongated flat bars, which may be made of wood or metal as may be desired, and are adapted to receive therebetween adjacent one end thereof an angular block 8, said members 6 and 7 and block 8 being secured together through the medium of suitable bolts 9. Adjacent their opposite ends the bolster members 6 and 7 are secured together through the medium of a vertical cross member 10. At each of their opposite ends, the bolster members 6 and 7 are provided with apertures, the apertures of the respective members registering, whereby said members may receive and support, in a vertical position, at one end, the intermediate portion of a rod 11. At its upper end the rod 11 is bent laterally to extend outwardly from the adjacent end of the said bolster members as at 12, said lateral projection or extremity terminating in a vertical or right angularly disposed end portion 13. At its opposite or lower end, the rod 11 is bent laterally and downwardly and outwardly as at 14 to provide a stub shaft for supporting a wheel 15. Thus it will be noted that the wheel 15 is supported, in somewhat of an oblique angle. At its opposite end, the bolster members 6 and 7 are also provided with aligned apertures whereby to support in a vertical position, the intermediate portion of a rod 17. Likewise the rod 17 at its upper end is provided with a laterally extending horizontally disposed portion 18, said extension terminating in an upwardly extending extremity 19.

At its opposite end, the bar is provided with a laterally extending projection 20, said projection 20 extending in parallelism to the extension 18, and this extension 20 is in the nature of a stub shaft and constitutes an axle for relatively smaller wheels 21. A tongue member 22 has one end thereof adapted for rest upon the top bolster member 6 and located upon that portion of the said bolster member opposite the top face of the block 8 as illustrated. The manner of securing this end of the tongue 22 to the bolster will be more fully hereinafter set forth. A relatively short bar 23 has one end thereof apertured so as to receive the upstanding extremity of the rod 17, said bar 23 extending downwardly and forwardly with respect to the bolster 5, to have its opposite end terminate beneath the tongue 22, adjacent the forward end of the tongue. A like bar 24, which is of greater length than the bar 23 has one end thereof apertured so as to receive the upstanding extremity 13 of the rod 11. Said bar 24 likewise extends forwardly and downwardly with respect to the bolster 5 and has its opposite ends terminating beneath the forward ends of the said tongue 22 and adapted to overlap the said end of the bar 23. As illustrated to advantage in Figure 5, the overlapping ends of the bars 23 and 24 respectively are each provided with spaced apertures 23′ and 24′ respectively, the said apertures adapted to register when the said ends are disposed in overlapping relation, so that said ends may be secured to the tongue through the medium of a bolt 25, which extends vertically through the tongue as at the forward edge and through the registering aperture, said bolt being provided at its free end with a threaded nut, whereby to hold said ends of the bars 23 and 24, in overlapped relation and affixed to the tongue.

A supporting bar 26 extends from opposite sides of the tongue 22′, said supporting bar 26 being pivotally connected at an intermediate portion to an intermediate portion of the tongue 22 as at 27. Disposed one to each side of the tongue 22 are the double whiffletrees 27—27, each of said whiffletrees being pivotally associated, one to each end of the transverse supporting bar 26, through the medium of links 28—28.

The tongue section 22 at its forward end has secured thereto a pair of links 29—29, one to each side of the tongue section, and said links at their forward ends extending in spaced parallelism and has pivotally mounted therebetween one end of the tongue extension bar or section 22′, as at 30. Extending rearwardly and in longitudinal alignment with the tongue sections 22 and 22′ is an elongated tail bar 31. This tail bar 31 has one end portion thereof secured to the outer end of the angular block 8 rearwardly of the bolster as at 32. That end of the bar adjacent the connection 32 is disposed in abutting relation with the rear or inner end of the tongue 22 and a plate 33 is bowed upon the abutting ends of said tail bar and said tongue, said plates being secured thereat through the medium of bolts 34, one of said bolts extending through one end portion of the plate, the adjacent end of the tail bar 31, while the other of said bolts extends through said plate, the bolster member 6, the block 8 and the lower bolster member 7, as shown to advantage in Figure 3. Thus is provided a rigid connection between the said tongue section 22 and the tail bar 31. Secured to the free end of the tail bar 31 is an extension bar 31′, which extension rod 31′ is slidable through an aperture in the lower ends of a clamping plate 35. An auxiliary clamping plate of somewhat smaller dimension is designated by the reference character 35′ and is operatively and adjustably associated with the clamping plate 35, through the medium of suitable bolts 36. These clamping plates are adapted to clamp therebetween the rear end portions of a sulky plow frame as shown to advantage in Figure 1, the sulky plow frame being illustrated in dotted lines and designated generally by the reference character B. Diagonally disposed upper and lower brace rods 37 and 37′ respectively have one end thereof secured to the upper and lower bolster members 6 and 7 respectively, the opposite ends of said brace rods being secured respectively to the upper and lower faces or sides of the tail bar 31 at an intermediate portion of said tail bar.

To secure the rear portion of the sulky plow B to the bolster of my improved hitch, I provide connecting means, such as illustrated in Figure 4, and which comprise a substantially rectangular flat face 38 which is secured to the upper bolster member 6, through the medium of split leaf members 39, secured to the inner edge of the said bolster member 6 and passing through suitable apertures formed adjacent one longitudinal edge of the plate 38 and adjacent opposite ends of the plate. As is obvious, the loop 39 functions as a hinged connection between said bolster 6 and the plate 38. Adjacent its opposite longitudinal edge, the plate 38 is provided with spaced aligned apertures 38′. A split leaf member 40 has its ends flattened so as to provide ears adapted to straddle the plate 38, the ears being apertured and adapted to register with the openings 38′ in the plate. A bolt or pin 41 is disposed through the apertured ears and that opening with which said apertured ears are in alignment so as to provide a pivotal connection between the plates and the loop member 40. A link member 42 is provided at one end with an eye adapted to receive the split loop member 40, and at its opposite ends with an eye receivable in an eye formed in the adjacent end of a link 43. On its other end the link 43 is also provided with an eye adapted to receive a U-bolt 44, which bolt 44 may be fixed or secured in the usual manner to one side member of the sulky plow frame B. (See Figure 1).

A bar 45 extends in parallelism with respect to and along one side of the transverse supporting bar 26, one end of the bar 45 being pivotally connected to a link 46, the opposite end of the link 46 being pivotally connected to the tongue 22 intermediate the bolster and the transverse supporting bars 26. At its opposite end, the bar 45 is pivotally connected to one end of a rearwardly extending bar 47, said bar 47 being adapted to rest upon the top bolster member 6 adjacent one end of said bolster and to extend rearwardly of the bolster being connected in a conventional manner to, and constituting for the sulky plow B the usual draft tongue.

From a study of Figure 1, it will be seen that the plow frame B extends laterally with respect to the tail bar 31 and thus at substantially right angles to my improved hitch whereupon it will be appreciated that the horses or other animals which may be harnessed to my improved hitch in an obvious manner will not tread between the furrows of the plowed ground, my improved hitch being associated with the plow in the manner illustrated and described.

From the foregoing then, it will be seen that I have provided an improved hitch and especially a hitch adaptable for sulky plows, the construction of the hitch being such as to permit the employment of four horses as a draft means for the plow instead of as was heretofore the custom, the employment of but three horses. Through the arrangement of the whiffletrees, one horse or draft animal for example, the draft animal harnessed to the outermost tree of that double whiffletree arranged directly forwardly of the plow B will walk in the furrow just previously made, while the remaining three draft animals will walk upon the "land", that is, upon the ground yet to be plowed.

It will also be appreciated that devices of this nature are simple in construction, strong, durable, thoroughly practical and reliable in use.

Even though I have herein shown and described the preferred embodiment of my invention, it is to be understood that the same is susceptible to changes fully comprehended by the spirit of the invention and the scope of the appended claims.

Having thus described my invention, what is claimed as new is:

1. In a hitch structure for plows, a wheel supported bolster, a draft tongue secured adjacent one end to said bolster to one side of the transverse center of the bolster, a tail bar extending rearwardly from the bolster in longitudinal alignment with said tongue, a rod extending longitudinally from adjacent the rear end of said tail bar and adapted for slidable engagement with the plow laterally of the plow, flexible means for connecting the forward end portion of the plow to said bolster between said tail bar and that end of the bolster farthest remote from said tail bar, an evener bar pivoted intermediate its ends to said tongue, a bar pivoted to said tongue and normally extending above and parallel to said evener bar, and said last mentioned bar adjacent one end of said evener bar adapted to be pivotally connected to the forward end of the plow draft tongue, and a double whiffletree adjacent each end of said evener bar whereby but one draft animal will walk in the previously made furrow and the remaining draft animals will tread on the unplowed ground.

2. A plow hitch for sulky plows comprising in combination a wheel supported bolster, the wheels of the bolster being of different diameters, the larger of the wheels being canted, a draft tongue extending from said bolster at that end of the bolster adjacent the smaller wheel, a tail bar extending rearwardly of the bolster in longitudinal alignment with said draft tongue, a guide clamp adapted to engage the frame of the plow, a rod extending rearwardly from said tail bar and adapted to slidably extend through an aperture provided therefor in said clamp, flexible means connecting said bolster with the forward portion of the plow between said tail bar and the canted wheels of the bolster, a draft evener carried by said tongue, double whiffletrees adjacent each end of said evener, a bar pivoted adjacent one end to said tongue and extending parallel to said evener, and means pivotally connecting the last mentioned bar with the forward end of the draft tongue of the plow, with the draft tongue of the plow normally extending parallel to said tail bar between said tail bar and that end of the bolster supported by the canted wheel.

In testimony whereof, I affix my signature.

CARL F. ORTMAN.